UNITED STATES PATENT OFFICE.

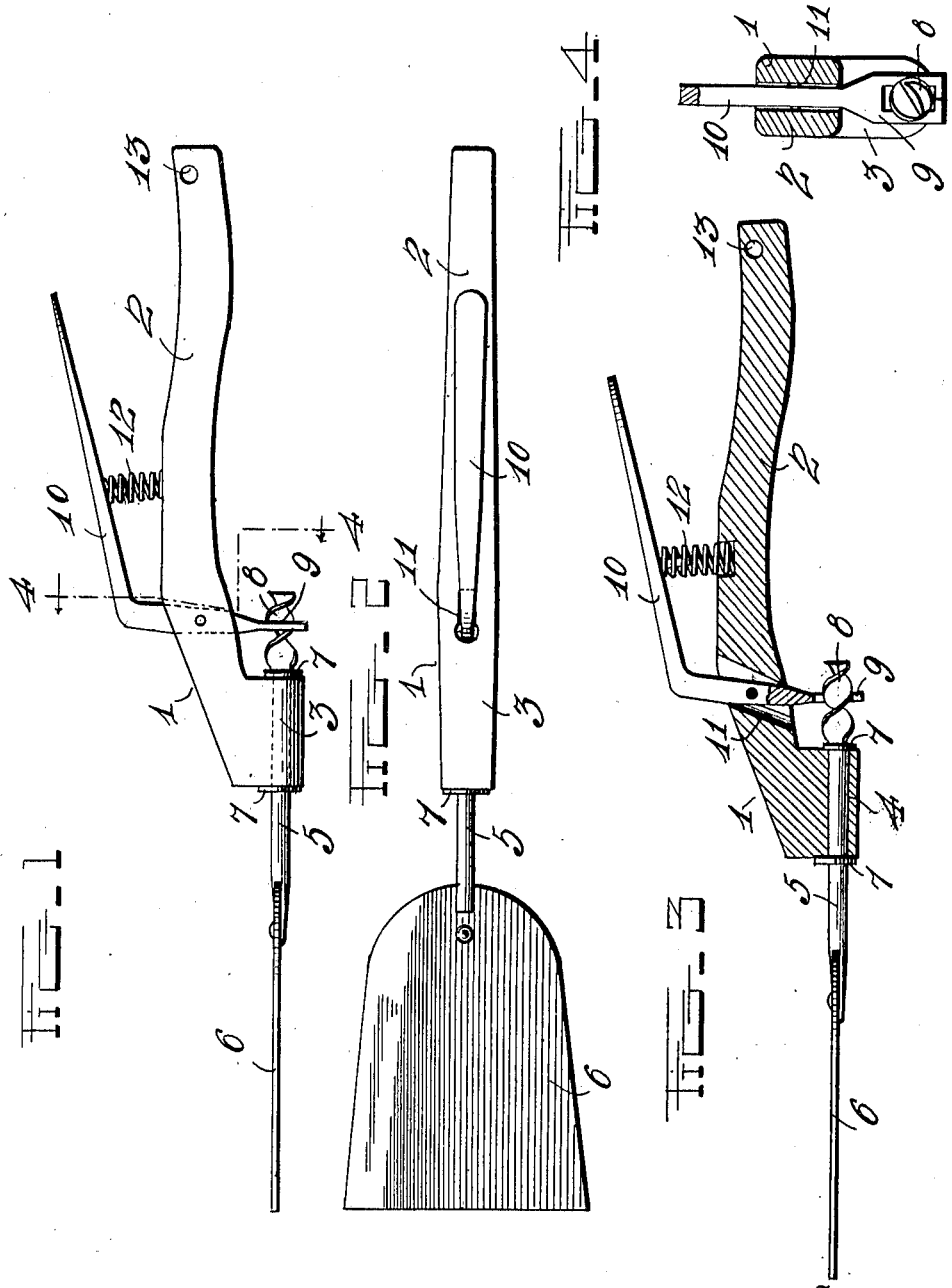

CHARLES OSNER, OF WEST MIDDLETOWN, OHIO.

CAKE-TURNER.

984,388.  Specification of Letters Patent.  Patented Feb. 14, 1911.

Application filed June 13, 1910. Serial No. 566,548.

*To all whom it may concern:*

Be it known that I, CHARLES OSNER, a citizen of the United States, residing at West Middletown, in the county of Butler and State of Ohio, have invented certain new and useful Improvements in Cake-Turners; and I do declare the following to be a full, clear, and exact description of the invention, such as will enable others skilled in the art to which it appertains to make and use the same.

This invention relates to improvements in cake turners.

One object of the invention is to provide a cake turner having means whereby the blade may be oscillated in the handle for the purpose of turning the cakes or other objects with which the blade is engaged.

Another object is to provide a cake turner of this character which will be simple, strong and inexpensive in construction, efficient in operation and well adapted to the purpose for which it is designed.

With the foregoing and other objects in view, the invention consists of certain novel features of construction, combination and arrangement of parts as will be more fully described and particularly pointed out in the appended claim.

In the accompanying drawings: Figure 1 is a side view of a cake turner constructed in accordance with the invention; Fig. 2 is a top plan view thereof; Fig. 3 is a vertical longitudinal sectional view; Fig. 4 is a vertical cross sectional view on the line 4—4 of Fig. 1.

Referring more particularly to the drawings 1 denotes my improved cake turner comprising a handle 2 which is preferably formed of cast metal and is constructed in any suitable shape. On the forward end of the handle is formed an offset head 3 which projects below the handle and has formed therein a longitudinal bearing passage 4 in which is revolubly mounted the shank 5 of the paddle or turning plate 6 of the implement. On the shank 5 adjacent to the inner and outer ends of the offset head 3 are secured stop collars 7 which hold the shank against longitudinal movement in the head.

The inner end of the shank 5 projects beyond the inner end of the head 3 and has formed thereon a double screw 8 with which is engaged the right angularly bent slotted lower end 9 of a paddle operating lever 10. Said end of the lever 10 is pivotally mounted in a slot 11 formed through the handle 2 adjacent to the inner end of the head 3. The slot 11 is preferably formed with a cylindrical portion and a straight portion (see Fig. 2) whereby the slotted lower portion of the right angularly bent end of the lever may be inserted through the slot after which said end of the lever is slipped longitudinally in the slot to its cylindrical end and pivotally connected to the handle as shown. The slot in the right angularly bent end of the lever is of such shape that when the screw 8 is engaged therewith and the handle end of the lever is rocked on its pivot, said screw and consequently the shank 5 and the blade 6 will be oscillated to turn the cake or other object with which the blade is engaged.

The upper portion of the lever 10 projects back over the handle 2 in a position to be engaged by the hand when gripping said handle whereby when said end of the lever is depressed it will force the slotted lower end to rotate the blade 6. In order to restore the parts to their normal positions after the lever has thus been depressed and the blade oscillated I provide a coiled spring 12 which is preferably arranged between the handle portion of the lever and the upper side of the handle 2. If desired the outer end of the handle 2 may be provided with an aperture 13 whereby the turner may be hung up when not in use.

A device of this character will be found to be extremely useful in connection with the frying or baking of any food which requires turning while being cooked.

From the foregoing description taken in connection with the accompanying drawings, the construction and operation of the invention will be readily understood without requiring a more extended explanation.

Having thus described my invention, what I claim is:

In a cake turner, a handle having formed therein a bearing passage, a shank revolubly mounted in said passage, means to hold said shank against lateral movement, a cake turning blade secured to the outer end of said shank, an operating screw arranged on the inner end of the shank, an operating lever pivotally mounted in said handle, said lever having a right angularly bent downwardly projecting end having formed therein a screw engaging slot whereby when said lever is depressed the screw will be turned, and a spring engaged with said lever whereby the same and the parts operated thereby are restored to their normal positions after being oscillated.

In testimony whereof I have hereunto set my hand in presence of two subscribing witnesses.

CHARLES OSNER.

Witnesses:
JOHN H. KENEF,
FRED T. E. JOHNSON.